INVENTORS
CHARLES J. KOESTER
EDGAR O. DIXON
ELIAS SNITZER

BY Robley S. Williams
ATTORNEY

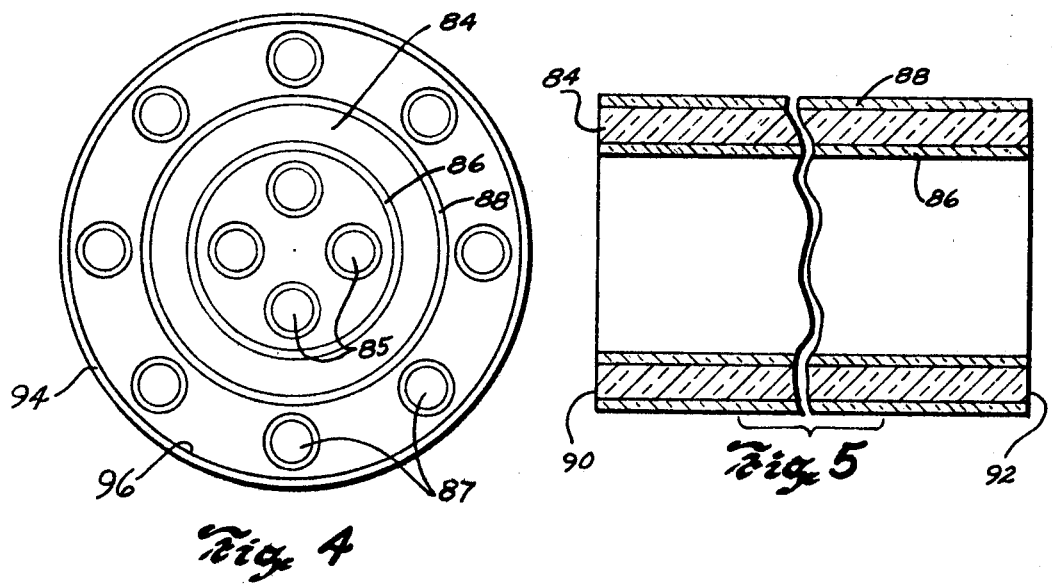
Fig. 4
Fig. 5
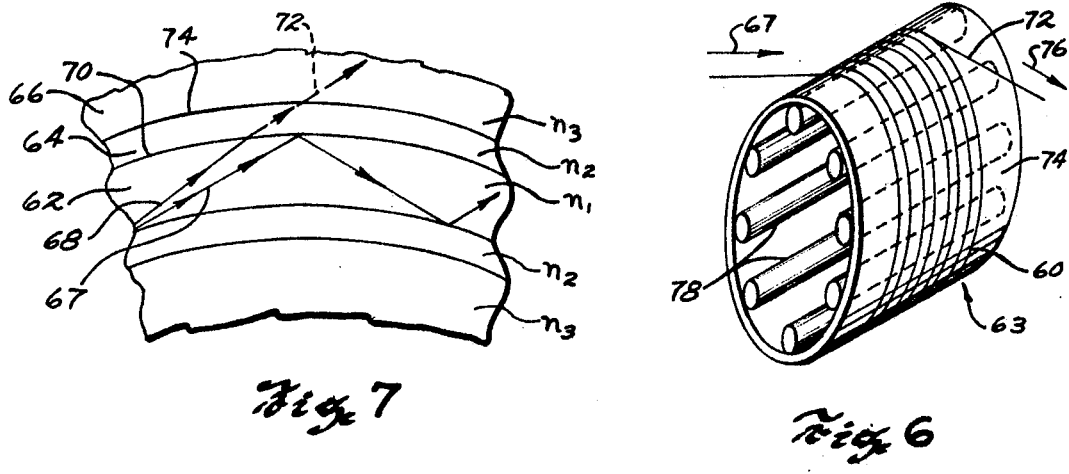
Fig. 7
Fig. 6
INVENTORS
CHARLES J. KOESTER
EDGAR O. DIXON
ELIAS SNITZER
BY
ATTORNEY

United States Patent Office 3,445,785
Patented May 20, 1969

3,445,785
LASER SYSTEMS AND THE LIKE EMPLOYING SOLID LASER COMPONENTS AND LIGHT-ABSORBING CLADDINGS
Charles J. Koester, South Woodstock, and Edgar O. Dixon, East Woodstock, Conn., and Elias Snitzer, Sturbridge, Mass., assignors, by mesne assignments, to American Optical Company, Southbridge, Mass., a corporation of Delaware
Filed Aug. 5, 1963, Ser. No. 299,794
Int. Cl. H01s 3/06, 3/16; G02b 5/14
U.S. Cl. 331—94.5            1 Claim

ABSTRACT OF THE DISCLOSURE

Elongated laser components of solid materials having side walls clad with selectively absorbing light-transmitting solid materials of substantially the same refractive indices as the components for providing increased operating efficiencies.

---

This invention relates to improvements in laser systems, laser components, and the like, and more particularly to improvements in the construction and arrangement of said systems and components, as well as to the materials employed therein so as to increase the operating efficiencies of such lasers and better control the laser emission characteristics thereof.

As it is well known in the prior art, when a laser of preselected kind is pumped sufficiently with optical energy of suitable wavelengths, it can be caused to reach a higher predetermined inverted energy level and at such time caused to emit a high intensity beam of optical energy at its predetermined laser emission wavelength.

In one known form of laser construction, laser material has been arranged in the form of a single elongated rod-like member having an appreciably greater length than width and has had its opposite parallel end walls disposed in perpendicular relation to the longitudinal axis thereof and suitably finished and coated with a highly reflective material so as to form an optical resonant cavity therebetween for generating a high intensity beam of optical energy at the predetermined laser emission wavelength thereof. While such a beam is emitted outwardly through one of these coated end walls which has been arranged to have a small percentage of transmission, the polished parallel side wall portions of this laser cavity were purposely left clear to allow optical energy at the laser puming wavelengths to pass readily therethrough.

In a slightly different known form of laser construction, there has additionally been used in conjunction with such a rod-like laser member construction, a clear transparent cladding material of a lower predetermined refractive index than that of the laser member, and this cladding material was disposed in surrounding contacting re'ation with the polished side wall portions of the rod-like laser member. The effect of this cladding material was to optically immerse the laser material within the transparent cladding material and thereby obtain an increase in the amount of pumping light which could be directed onto the laser material forming the rod-like member.

It has now been found that by following the teachings of the present invention, wherein by the proper selection of a cladding material for use with the selected laser material being used and with due care being given as to the light-transmitting, light-absorbing, and refractive index properties thereof, it is possible to provide in a laser construction of the character described, higher operating efficiencies and a better control as to the laser emission characteristics thereof than have been possible heretofore. These results have been obtained by employing in optical contact with the smooth side wall portions of such an elongated rod-like main body member of laser material, a transparent cladding of preselected kind and character so as to have suitable light-transmitting and light-absorbing characteristics to function properly with the laser material being used as well as to have its refractive index, and its other physical and chemical properties correctly chosen to work therewith, as will be explained more fully hereinafter.

In a further modified construction of the invention, it has been found desirable to employ between such an elongated main body member of laser material and the transparent but selectively absorbing cladding material being used therewith, a layer of clear, transparent material which has been chosen with careful consideration being given as to its refractive index when compared with that of the main body member and of the cladding material so as to enable the formation of an elongated travelling wave-type of laser amplifier, the details of construction and properties of which will be more fully set forth hereinafter.

The words "light" and "optical energy" as used above, and also as used hereinafter, are intended to include radiant energy within the various parts of the optical region of the electromagnetic spectrum and, accordingly, are considered to apply not only to visible light but to infrared and ultraviolet radiation as well.

It is, accordingly, a principal object of the present invention to provide a laser construction, a laser system or the like in the form of an elongated main body member formed of a known solid laser material and having in surrounding contacting relation with the optically finished side wall portions thereof a cladding layer of predetermined thickness and of a suitable solid transparent material which has been carefully chosen so as to have not only substantially the same or very nearly the same refractive index as that of the laser material but also carefully chosen so as to have special selective absorption and transmission characteristics for optical energy at different predetermined parts of the optical spectrum; said characteristics being such that the cladding material transmits the greater part of the pumping light energy being supplied thereto into the laser material and, at the same time, having high absorption for optical energy at the laser emission wavelength. Thus, this layer will not only absorb most of the pumping energy corresponding to the laser emission wavelength but also will absorb most of the spontaneously emitted laser light generated within the laser material and travelling in directions other than longitudinally of the main body member. Because optical energy at the emission wavelength can be so absorbed, it is possible in this manner to increase the operating efficiency of the laser construction and also provide a better control of the emission characteristics obtained thereby.

It is also an object of the present invention to provide a modified form of laser construction wherein in combination with an elongated main body member of laser material and which may have a desired longitudinal surface curvature, a multiple layer cladding provided upon the curved side wall portion thereof and with the first layer thereof being formed by a nonabsorbing transparent solid material of nearly the same refractive index as that of the laser material. and in optical contact with the smooth outer curved side wall portions thereof a second transparent layer of solid cladding material of a carefully chosen selective absorbing type and of substantially the same refractive index as the first layer; whereby said second layer will absorb most of the optical energy of the laser emission wavelength which enter the second layer, whether same is spontaneously emitted light or pumping light, and while being highly transparent to optical energy at shorter pumping wavelengths.

It is a further object of the invention to provide an elongated main body member formed of a laser material which is readily workable or moldable into any shape desired and with this body member surrounded by a single, or a multiple layer, cladding having light-transmitting and selectively absorbing characteristics and of a controlled refractive index, or indices, as desired, relative to the index of the main body member; the material or materials forming said single or multiple cladding also being readily moldable or formable so as to assume any particular shape desired in the laser construction.

It is a further object of the present invention to provide an elongated main body member of laser material having a multiple layer cladding surrounding the side wall portions thereof and in intimate contact therewith; said elongated main body member being of appreciably greater length than the transverse dimension thereof and arranged in a coiled helical shape so as to form a travelling wave-type laser amplifier, said cladding including a transparent layer and a selectively absorbing layer adapted to absorb optical energy at the laser emission wavelength but being highly transparent to the pumping wavelengths for the laser material.

Other objects and advantages of the invention will become apparent from the detailed description which follows when taken in conjunction with the accompanying drawing in which:

FIG. 4 is an end view of a resonant cavity form of laser construction modified for high laser emission output and embodying the present invention;

FIG. 5 is a longitudinal sectional view of a laser component such as might be used in the structure of FIG. 4;

FIG. 6 is a perspective view showing a travelling wave form of laser amplifier construction and embodying the present invention;

FIG. 7 is an enlarged fragmentary showing of the curved laser component of FIG. 3.

Figure 1:
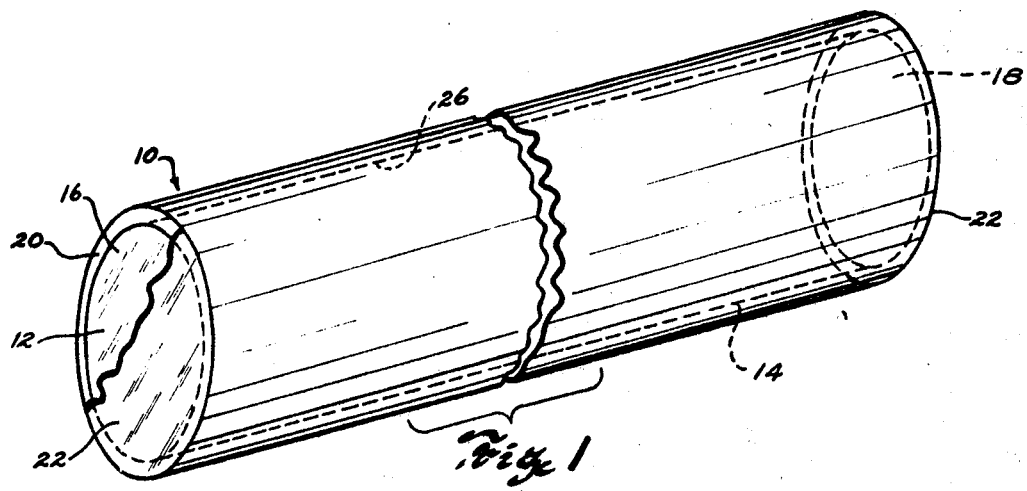
FIG. 1 is a perspective view of a resonant cavity form of laser construction embodying the present invention.

Referring to the drawings in detail and, in particular, to FIGURE 1, it will be seen that the numeral 10 indicates generally a laser construction comprising an elongated straight-sided cylindrically-shaped solid rod-like main body member 12 which may be formed of any one of a number of different known laser materials, and this member is preferably provided with smooth optically finished or polished parallel side wall portions 14. In this particular showing, the main body member 12 which might be used in forming an optical resonant cavity laser is made of a somewhat greater predetermined length than its width and is provided with flat polished opposite end faces 16 and 18 which are each disposed in precisely normal relation to the longitudinal axis of this main body member 12.

In surrounding relation to this main body member 12 and in optical contact with its smooth side wall portions 14 is a selectively absorbing transparent cladding 20. Also upon the flat opposite end faces of the main body member 12 are disposed a pair of highly reflective coatings 22 formed of a suitable material, such as silver or the like. Thus, these end surfaces will provide high internal reflection for the optical energy within the resonant cavity and impinging thereon. Preferably one of these reflective coatings would be arranged to allow a small percentage of laser light transmission while the coating at the opposite end would be totally reflective.

In keeping with the present invention, it has been found that the operating efficiencies and the laser emission characteristics of known laser materials can be materially improved by following the teachings of the present invention. Thus, if the transparent cladding material 20 is carefully chosen with reference to the laser material being used to form the main body member 12, an improved device can be produced. Not only should the cladding material be carefully chosen so as to have predetermined light-transmitting and light-absorbing characteristics in accordance with laser material being used therewith but also should be carefully chosen so as to have a predetermined refractive index which is substantially the same or very nearly the same as that of the laser material forming the main body member 12. More specifically, this cladding material should be both highly transparent to optical energy at the wavelengths at which the laser material is to be pumped and also should have high absorption for optical energy at the emission wavelength. Furthermore, this cladding material should have suitable physical and chemical properties so as to be compatible and operable with the laser material.

By way of an example, it has been found desirable when the main body member 12 of the laser is formed of a neodymium-doped barium crown glass (such as a 2.4% by weight trivalent neodymium containing glass) to have its side wall portions clad with a layer of glass of suitable thickness and containing an absorptive ingredient which is such as to provide high transmission of optical energy at the pumping wavelengths for said neodymium-doped laser glass and, at the same time, provide high absorption at the 1.06 micron emission wavelength of this neodymium laser glass. Also, it is desirable to have the refractive index of this cladding glass substantially or nearly the same as that of the laser glass. Other concentrations of neodymium ranging from approximately 1% to 20% are useable in the laser glass.

When such is the case, not only will absorption of pumping optical energy at the 1.06 micron wavelength be absorbed by the cladding glass but also spontaneous laser light generated within the laser and travelling in directions so as to reach the interface 26 formed between the main body member 12 and the cladding material be allowed to pass through this interface without reflection and thereafter be absorbed by said cladding glass. When such absorption by the cladding material is provided, spontaneously emitted laser light will be prevented from travelling in directions other than longitudinally within the laser material and, accordingly, secondary emission as a result thereof will be avoided. Otherwise, such spontaneous emission would tend to reduce the inversion in the laser material and raise the threshold conditions of the laser cavity, and also cause higher order optical modes to be emitted from the laser.

Desired laser emission in a resonant cavity structure, such as that shown in FIGURE 1, is in the longitudinal direction of the main body member 12. However, spontaneous laser emission of photons from any single selected fluorescing point in the inverted laser material can take place in any direction and since the gain in amplification from any photon at the emission wavelength is exponentially related to its path length in the inverted laser material, it is desirable to make the transverse dimension of the main body member of laser material relatively short as compared to the longitudinal dimension thereof. Also, it is desirable to prevent as much as conveniently possible internal reflection of such wrongly directed photons from sidewall portions thereof. Otherwise photons travelling in directions other than substantially parallel to the longitudinal dimension of the resonant cavity can cause undesired depopulation of the inverted energy levels, both before and after reflections at said sidewall portions.

It has been found that relative to laser structures, like that shown in FIGURE 1, internal reflections from the interfaces between the laser material and the cladding material can be substantially completely eliminated, or very nearly completely eliminated, by the proper choice of the absorptive cladding material to be used with the laser material being used. For example, when the neodymium-doped barium crown glass mentioned above and which has a refractive index of approximately 1.54 is used to form the straight-sided main body member 12 and a known ferrous iron containing alumina-phosphate glass cladding, which has a refractive index of approximately 1.52 and which will be more fully described hereinafter, are used together, a laser construction of high optical quality and operative efficiency can be provided.

Figure 8:
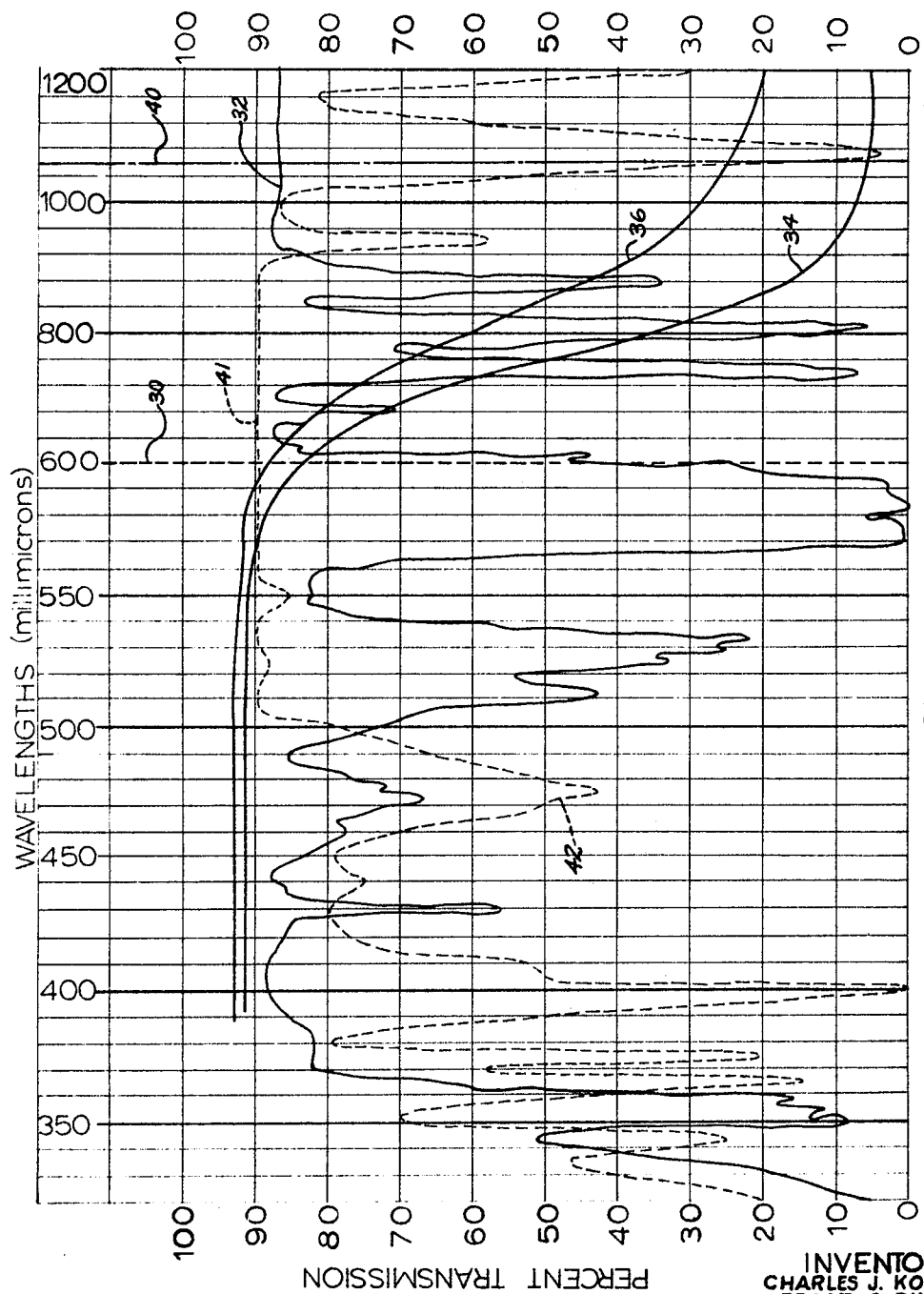
FIG. 8 is a chart showing transmission curves for several different selected materials plotted against wavelength values and for use in carrying out the invention.

If reference is now made to the chart shown in FIGURE 8, it will be seen that a wavelength scale (in millimicrons) has been indicated in the horizontal direction thereon and a percentage transmission scale from 0 to 100% has been indicated in the vertical direction thereon. Furthermore, it should be noted that within the region from 320 to 600 millimicrons, for convenience, intervals on the scale have each been made equal to 10 millimicrons while above the 600 value (indicated by the dotted line 30) successive intervals on this scale have been made equal to 40 millimicrons.

Upon this chart a transmission curve 32 for the above-mentioned 2.4% tri-valent neodymimum-doped barium crown laser glass (having a thickness of approximately 13.4 millimeters) has been plotted. From a close study of this curve, it will be appreciated that the transmission and absorption characteristics of this laser glass are very distinctive, same having relatively high transmission values in certain parts of the spectrum and high absorption values in other parts thereof. Thus, it will be seen that this neodymium laser glass while being quite transparent to optical energy at certain parts of the spectrum, has, nevertheless, a strong absorption band in the region around 580 millimicrons, and another absorption band in the region around 530, as well as some absorption in the ultraviolet and in the infrared.

Also shown upon this chart of FIGURE 8 by a first heavy line 34 and a second heavy line 36 are the transmission curves of two different samples of ferrous iron containing alumina-phosphate glass of slightly different iron concentration and it will be appreciated that both of these curves indicate relatively high optical energy transmission properties within the wavelength region between 390 and 600 millimicrons and a fair amount of transmission in the region between 600 and 800 millimicrons. On the other hand, at the 1.06 micron location in the infrared region of the chart (indicated by dotted line 40) and corresponding to the laser emission wavelength of the neodymium laser glass, both of these curves exhibit relatively strong energy absorption characteristics. It will be readily appreciated from this chart, therefore, that while high absorption of optical energy by this ferrous iron containing glass occurs in the region of the neodymium laser emission, in the region near 580 millimicrons, in the region near 350 millimicrons and in the infrared region near 800 millimicrons, comparatively good transmission of pumping energy through this glass when used as a cladding glass for a neodymium glass laser, is provided.

U.S. Patent No. 2,359,789 discloses a number of different ferrous iron containing glasses of the type referred to above and having good absorption at the 1.06 micron region in the infrared as well as good light transmission in the visible region. Furthermore, it should be appreciated that the physical and chemical properties of this type of cladding glass are well adapted for use with the above-mentioned neodymium-doped laser glass, which as is already known may contain various amounts of neodymium from a fraction of one percent up to approximately thirty percent.

Since the refractive indices of the neodymium glass and of the ferrous iron containing alumina-phosphate glass are nearly equal, very little internal reflection of laser light will occur at the interface 26 when the laser construction of FIGURE 1 is being energized by pumping optical energy being transmitted into the cavity through side wall portions thereof for causing laser emission. Most spontaneously emitted photons which travel in directions toward the interface 26, because of the similarity in indices, will pass thorugh the interface and into this cladding material and will be absorbed thereby. Also, any optical energy at the 1.06 micron wavelength which this cladding glass receives directly from the pumping light source likewise will be absorbed. On the other hand, the cladding layer 20, which may be made of the thickness required for absorbing such energy at the laser emission wavelength, while allowing transmission of the pumping energy needed, provides an additional advantage in that it serves as means for optically immersing the laser glass and thereby providing a gain in the pumping light density at the laser material. Additionally, since the spontaneous laser emission which is not being absorbed by the cladding material will be travelling generally in the longitudinal direction of the laser cavity, it will be propagated at increased optical efficiency and emitted from the cavity in the form of lower order optical modes.

In keeping with the present invention, it has also been found that other selectively absorbing light-transmitting materials may be advantageously provided for cladding the main body member of laser material; said cladding material, of course, being selected in accordance with the emission and absorption characteristics of the laser material with which it is to be used as well as the refractive index thereof. For example, it has been found that a soda-lime crown glass, containing in the neighborhood of 10% by weight of samarium trioxide as an ingredient of the glass-forming batch, may be used as a cladding material for a neodymium-doped barium crown laser component with advantageous results. In this connection, there is shown by dotted line 41 in the chart of FIG. 8, the transmission curve for such a samarium-doped crown glass. Even though this samarium-doped cladding glass does not display as good transmission characteristics in the 350 millimicron neodymium laser pumping region of the spectrum, nevertheless, it has very good transmission at the 580 millimicron and at the 800 millimicron regions thereof, as well as a high or strong absorption at the 1.06 micron region, indicated by the dot-dash line 40. The result is that a high degree of selective absorption may be likewise provided such a neodymium-doped laser glass by this 10% samarium-doped cladding glass layer thereon; and, in this way, obtain increased operating efficiencies with lower order mode propagation than would be possible if a non-absorbing glass cladding were being used.

Another material which might be used as a selectively absorbing cladding for a neodymium-doped laser glass is barium crown glass containing approximately 10% by weight of dysprosium therein; and while this latter glass does not have quite as good energy absorption at the 1.06 micron emission wavelength for neodymium glass lasers, it has, on the other hand, very good light-transmitting properties at the shorter pumping wavelength bands therefor and also has very nearly the same refractive index as that of the laser glass.

Other glasses which have been made to laser are trivalent ytterbium-doped glass and trivalent holium-doped glass, and it would be possible to likewise provide these laser glasses with selectively absorbing glass claddings and thereby gain the advantages of the present invention.

While neodymium and other laser glasses provided with selectively absorbing claddings has been discussed above, it should be appreciated that it is possible to apply the teachings of the present invention to crystal-type laser materials as well. For instance, it is well known that a ruby crystal can be "grown" and formed into a rod-like member and finished so as to function as an optical resonant cavity for laser purposes. Ruby, of course, is chromium-doped aluminum oxide and has a high refractive index, in the neighborhood of 1.77. It is, however, within the teachings of the present invention to form or "grow" upon the optically finished side walls of such a rod-like ruby laser member a suitable selectively absorbing cladding for increasing the operating efficiencies and mode propagation characteristics thereof. A suitable cladding material for ruby, of course, must have a relatively high refractive index in order to remove as much as possible the possibilities of internal reflections of spontaneously emitted laser energy at the side-wall interfaces therebetween.

It has been found that a suitable high index selectively absorbing cladding material having substantially the same refractive index as that of ruby could be formed from blue sapphire (iron-doped aluminum oxide) which has good transmission of optical pumping energy in the 500 to 600 and in the 320 to 440 millimicron pumping bands for ruby and has material energy absorption at the 694 millimicron emission wavelength of ruby.

Figure 2:
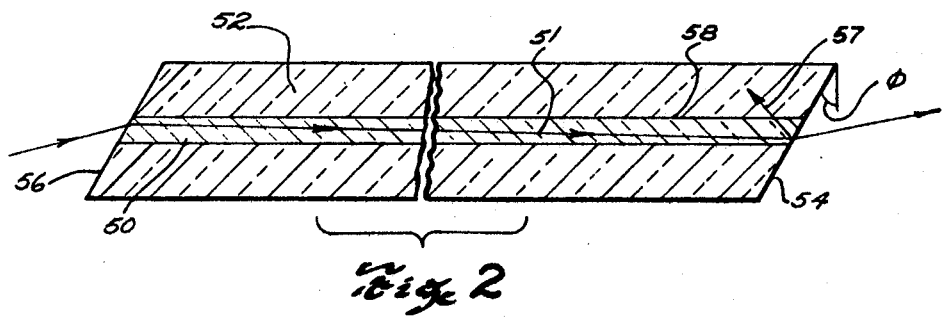
FIG. 2 is an elongated sectional view of a laser amplifier construction embodying the present invention.

In FIGURE 2 is shown a modified laser construction in the form of a laser amplifier comprising a straight-sided rod-like main body member 50 or core of a laser material and in optical contact with the polished side wall portions thereof is disposed a selectively absorbing cladding material 52 which has been suitably chosen so as to function therewith in a manner such as already referred to above. The materials, arrangement and construction in this figure are such that opposite end portions of the assembly are so angularly disposed, relative to the longitudinal axis thereof, as indicated by the angle $\phi$, that substantially no light within the member 50, such as a ray 51 (preferably carrying a signal and being supplied by the laser emission and travelling along the length of the laser member 50 so as to impinge upon an end wall 54 (or 56) will be internally reflected back along the length of the laser member.

Instead, the internally reflected portion 57 of this ray, as indicated at 57, will be directed toward and through the interface 58 between the core and cladding (which have nearly the same indices) at such an angle as to pass into the cladding and be absorbed thereby. Also spontaneously emitted laser energy reaching the interface 58 will likewise pass therethrough and be absorbed. In such an improved amplifier construction, high optical gain will be obtained.

Figure 3:
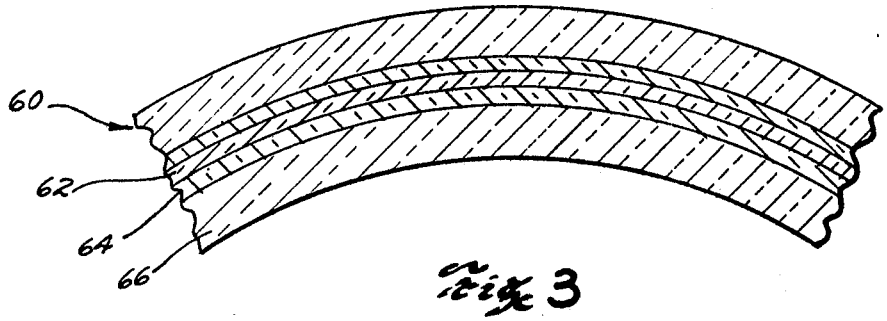
FIG. 3 is a fragmentary longitudinal sectional view of a modified form laser component embodying the present invention.

In FIGURE 3 is shown in longitudinal section a slightly modified construction of laser amplifier component 60 which is purposely appreciably curved and which might very well represent a section taken from a curved laser device such as the helically coiled travelling-wave type of laser amplifier 63 disclosed in FIGURE 6. This curved component 60 in FIG. 3, it will be noted, has its main body member or central elongated core 62 preferably formed of a neodymium-doped laser glass which is provided, upon its side walls, with a multiple layer cladding comprising a first or inner layer 64 and a second or outer layer 66. The first layer 64, because of the curved condition of the laser device is formed of a clear transparent glass of a slightly lesser refractive index value than that of the core 62. On the other hand, the second layer 66 is preferably formed of a selectively absorbing glass which has been chosen to work therewith and has a refractive index substantially equal to that of layer 64.

The purpose of such a double layer cladding arrangement will better be understood by reference to FIGURE 7 wherein core 62, first layer 64 and second layer 66 have been shown appreciably enlarged. In this figure wherein it is indicated that the index of core, first cladding layer and second cladding layer are respectively $n_1$, $n_2$ and $n_3$, some refractive index difference is desirable between $n_1$ and lower refractive index $n_2$ in order to have the signal or ray 67 being amplified travel longitudinally down the length of the curved core 62, by the phenomena of total internal reflection without passing through interface 70; and likewise, desirable to have any light rays at greater angles to this interface, or due to spontaneous emission, such as indicated by arrows 68, pass through interface 70 and into the clear lower index glass forming layer 64. Such radiation will continue in the same direction as it passes through the second interface 74, formed between first layer 64 and second layer 66 since these two layers have their refractive indices $n_2$ and $n_3$ substantially equal.

The result of this multiple layer construction is that while the amplified signal within the curved core 62 is retained within the core due to said small index difference as it is transmitted at high optical gain longitudinally through the core from the entrance to the exit end thereof, spontaneously emitted laser light, within the core and travelling at greater angles to the side walls than ray 67, pass outwardly through side wall portions of this core member 62 and on through clear layer 64 into absorbing layer 66. The refractive index difference between $n_1$ and $n_2$ is kept as small as practical and consistent with the idea of transmitting the incoming signal through the amplifier core with high optical efficiency and lower orders of mode propagation while absorbing as much unwanted spontaneous emission as possible.

Thus in FIGURE 6, optical signal, represented by the arrow 67, will travel along the relatively long thin laser amplifier member or double clad fiber component 60 wound in helical form around the transparent supporting drum 74. Any desired number of convolutes for amplifying the laser signal may be provided before the signal is allowed to travel outwardly through the exit end 72 of the laser component as indicated by the arrow 76. Within the transparent drum 74 is positioned one or a plurality of high intensity pumping light sources 78 which are evenly spaced in circumferential arrangement near the drum. Of course, if desired, a reflective housing (not shown) could be arranged to encircle this laser assembly for increasing the optical pumping efficiency thereof.

It will be appreciated that the transverse dimension of the laser core 62 of the curved fiber laser component shown in FIGS. 3, 6 and 7 is very small in comparsion to its length, with the result that misdirected spontaneous laser emission is not allowed to travel any appreciable distance within the core before passing into and being absorbed by the cladding. Also relative to such a single clad fiber laser component and also double clad fiber laser component formed of glass, same may be readily manufactured by known drawing methods such as commonly used in the fiber optics art. Also it will be appreciated that since the degree of curvature of the fiber core is very slight when compared with the transverse dimension thereof, only a slight difference in refractive index between core and cladding in contact therewith is required to insure transmission of the laser amplified signal down the core while allowing said misdirected spontaneously laser emission to escape into the absorbing cladding.

In FIGURE 4 is shown the end view of a cylindrically-shaped laser member 84 preferably formed of a neodymium-doped laser glass or the like and, upon the inner and outer optically finished side wall portions respectively of this hollow elongated cylindrically-shaped member 84, are disposed selectively absorbing layers 86 and 88 here shown formed of a suitable selectively absorbing material such as one selected from those already described for cladding purposes. Within and around the outside of this elongated coated cylindrically-shaped laser member 84 are disposed a plurality of high intensity light sources 85 and 87 in such a manner that a very high degree of pumping optical light energy may be transmitted through the inner and outer clad side wall surfaces to the laser material, said layers 86 and 88 being highly transparent to such light at pumping wavelengths but highly selectively absorptive at the laser emission wavelength, such as at 1.06 microns. Upon the end surfaces of this laser component 84 may be disposed reflective surfaces 90 and 92, if desired, for the same purposes as described above relative to FIGURE 1, whereby an optical resonant cavity is formed therebetween and high laser light output at lower mode propagation may be provided thereby. If desired, it would be possible alternatively to provide in place of the single inner and outer layers 86 and 88 for the cylindrical member 84, inner and outer double layers like those mentioned above relative to the elongated curved laser component of FIGS. 3 and 7. A surrounding cylindrical housing is shown at 94 in FIG. 4 disposed in concentric relation to laser member 84 and has a highly reflective inner surface 96.

Having described our invention, we claim:

1. A laser construction comprising an elongated main body member having a central core and a double layer cladding in surrounding relation thereto, said core being of appreciably greater length than the transverse dimension thereof and having smooth side wall portions thereon, said core being formed of a laser glass having a predetermined refractive index and capable of stimulated laser emission at a predetermined wavelength when pumped through the side wall portions thereof to a known higher excited energy level by optical energy of the stimulating wavelength regions of said laser glass, said double cladding being formed by a first layer of clear glass disposed in intimate optical contact with the smooth side wall portions of said core and a second layer surrounding said first layer, said clear glass having a predetermined refractive index which is of a slightly lower refractive index value than that of said laser glass, so as to provide a small controlled refractive index difference at the interface between said core and cladding, said second layer being formed of a selectively absorbing glass having relatively high light transmission properties for optical energy at the stimulating wavelength regions of said laser glass and having relatively high light-absorbing properties for optical energy at the laser emission wavelength of said laser glass, said second layer having a refractive index which is of no greater value than that of said first layer, said elongated body member being curved intermediate its opposite ends into a helical shape comprising a plurality of adjacent similar convolutes, so as to be disposed in adjacent relation to an associated elongated pumping light source means when in use, said slightly lower refractive index of said first layer being of such a controlled value relative to the refractive index of said laser glass as to cause nearly axially-directed optical energy at the laser emission wavelength within said laser core, when incident thereon, to be reflected back into said core for travel generally lengthwise thereof while all appreciably off-axis optical energy at said laser emission wavelength within said laser core will enter said first layer and thereafter enter said second layer and will be absorbed thereby.

References Cited

UNITED STATES PATENTS

| | | | |
|---|---|---|---|
| 2,049,765 | 8/1936 | Fischer | 252—301.4 |
| 2,099,602 | 11/1937 | Fischer | 252—301.4 |
| 2,444,976 | 7/1948 | Brown | 350—1 |
| 3,087,374 | 4/1963 | Devlin et al. | 331—94.5 |
| 3,353,115 | 11/1967 | Maiman | 331—94.5 |
| 3,354,405 | 11/1967 | Bebb et al. | 331—94.5 |
| 3,356,966 | 12/1967 | Miller | 331—94.5 |
| 3,102,920 | 9/1963 | Sirons | 331—94.5 |
| 2,929,922 | 3/1960 | Schawloa et al. | 331—94.5 |
| 2,825,260 | 3/1958 | O'Brien | 88—1 |
| 3,051,038 | 8/1962 | Duke | 88—1 |
| 3,162,822 | 12/1964 | Tackaberry | 331—94.5 |
| 3,253,500 | 5/1966 | Hicks | 88—1 |

FOREIGN PATENTS 1,323,829  3/1963  France.

OTHER REFERENCES

Snitzer: "Optical Maser Action of $Nd^{+3}$ in a Barium Crown Glass," Phys. Rev. Letters, vol. 7, No. 12, Dec. 15, 1961, pp. 444–446.

JEWELL H. PEDERSEN, *Primary Examiner.*

RONALD L. WIBERT, *Assistant Examiner.*

U.S. Cl. X.R.

330—4.3; 350—96